(12) United States Patent
Wolf

(10) Patent No.: US 7,917,747 B2
(45) Date of Patent: Mar. 29, 2011

(54) MULTI-PARTY ENCRYPTION SYSTEMS AND METHODS

(75) Inventor: Bryan Wolf, Reno, NV (US)

(73) Assignee: IGT, Reno, NV (US)

( * ) Notice: Subject to any disclaimer, the term of this patent is extended or adjusted under 35 U.S.C. 154(b) by 1029 days.

(21) Appl. No.: 11/690,054

(22) Filed: Mar. 22, 2007

(65) Prior Publication Data

US 2008/0235510 A1     Sep. 25, 2008

(51) Int. Cl.
H04L 29/00   (2006.01)
(52) U.S. Cl. .......................................... 713/161; 713/163
(58) Field of Classification Search .................. 713/161, 713/163
See application file for complete search history.

(56) References Cited

U.S. PATENT DOCUMENTS

| | | | |
|---|---|---|---|
| 4,218,582 A | | 8/1980 | Hellman et al. |
| 4,405,829 A | | 9/1983 | Rivest et al. |
| 5,643,085 A | | 7/1997 | Aityan et al. |
| 5,643,086 A | | 7/1997 | Alcorn et al. |
| 5,848,159 A | | 12/1998 | Collins et al. |
| 5,867,578 A | * | 2/1999 | Brickell et al. ............... 713/180 |
| 5,905,799 A | * | 5/1999 | Ganesan ........................ 380/279 |
| 6,071,190 A | | 6/2000 | Weiss et al. |
| 6,237,097 B1 | * | 5/2001 | Frankel et al. ................ 713/180 |
| 6,364,796 B1 | | 4/2002 | Nakamura et al. |
| 6,722,986 B1 | | 4/2004 | Lyons et al. |
| 7,063,615 B2 | | 6/2006 | Alcorn et al. |

FOREIGN PATENT DOCUMENTS

| | | |
|---|---|---|
| EP | 2137877 | 12/2009 |
| WO | 2008/118648 | 10/2008 |

OTHER PUBLICATIONS

Boneh D et al: "Efficient Generation of Shared RSA Keys" Advances in Cryptology—CRYPTO '97, pp. 425-439.*
Menezes et al: "Handbook of Applied Crytography", 1997, pp. 283, 285-289, 524-529, 547-550, 553-554.*
RSA Laboratories, "PKCS#1 RSA Cryptography Standard," Jun. 14, 2002, 61 pages.
Rivest, et al., "A Method for Obtaining Digital Signatures and Public-Key Cryptosystems," Communications of the ACM, vol. 21 (2), Feb. 1978, pp. 120-126.
Bruce Schneier "Applied Cryptography," Second Edition, John Wiley & Sons, 1996, pp. 466-469, 527-528, 600-605.
International Search Report and Written Opinion dated Sep. 1, 2008 from Application No. PCT/US2008/056835 (now Publication No. WO 2008/118648).
International Preliminary Report on Patentability dated Sep. 22, 2009 from Application No. PCT/US2008/056835 (now Publication No. WO 2008/118648).

* cited by examiner

*Primary Examiner* — Vivek Srivastava
*Assistant Examiner* — Anthony Brown
(74) *Attorney, Agent, or Firm* — Weaver Austin Villeneuve & Sampson LLP

(57) ABSTRACT

A cryptographic communication system and method having a first plurality of stations, each of the first plurality of stations having at least one encryption key $K_j$, were j is a number greater than 2, a data packet D to be viewed by each of the first plurality of stations, means for encrypting the data packet by each of the first plurality of stations to form an encrypted data packet $E_j$ for transmission to a central processor, and means for combining each of the encrypted data packets, wherein the means for encrypting is applied in parallel to allow each of the first plurality of stations to view the contents of the data packet D prior to encrypting the data packet D.

19 Claims, 5 Drawing Sheets

MULTI-PARTY ENCRYPTION SYSTEMS AND METHODS

TECHNICAL FIELD

The present invention relates generally to communicating data in a secure fashion, and more specifically to the encryption of data sent by multiple parties.

BACKGROUND

Computer systems are found today in virtually every walk of life for storing, maintaining, and transferring various types of data. The integrity of large portions of this data in many fields, such as finances and gaming, is vital to the health and survival of numerous commercial enterprises. As open and unsecured data communications channels for sales or gaming transactions gain popularity, such as playing a game of chance on a remote gaming terminal or making credit card transactions over the Internet, individual consumers have an increasing stake in data security. Thus, it is important that communications pass from a sender to an intended receiver without intermediate parties being able to interpret the transferred message.

Cryptography, especially public key cryptography, has proven to be an effective and convenient technique of enhancing data privacy and authentication. Data to be secured, called plaintext, is transformed into encrypted data, or ciphertext, by a predetermined encryption process of one type or another. The reverse process, transforming ciphertext into plaintext, is termed decryption. The processes of encryption and decryption are controlled by a pair of related cryptographic keys. A "public" key is used for the encryption process, and a "private" key is used to decrypt the ciphertext. The public key transforms plaintext to ciphertext, but cannot be used to decrypt the ciphertext to retrieve the plaintext therefrom.

A well-known example of public key cryptography is "RSA" encryption, which was developed by Rivest, Shamir and Adleman at MIT in the 1970s. RSA encryption capitalizes on the relative ease of creating a composite number from the product of two prime numbers whereas the attempt to factor the composite number into its constituent primes is difficult. RSA encryption may be used to exchange encrypted messages whereby two parties create a key pair, taking one key each. Each party may use its key to encrypt a message that can only be decrypted by the other party. RSA encryption may also be used to receive encrypted messages from any source whereby a first party creates a key pair. The first party makes the modulus and one key publicly known and keeps the other key secret. A second party may then use the public key to encrypt a message that can only be decrypted by the first party holding the secret key. Also, RSA encryption may be used for authentication where a first party creates a key pair and makes the modulus and one key publicly known. The other key is kept secret. The first party may then create a message and encrypt the message, or a hash of the message, with the secret key and publish the message. A message or a hash that can be decrypted by the public key is then known to come from the holder of the secret key, thereby authenticating its source. Further details regarding RSA encryption can be found at, for example, *A Method for Obtaining Digital Signatures and Public-Key Cryptosystems*, R. Rivest, A. Shamir, L. Adleman, Communications of the ACM, Vol. 21 (2), pp. 120-126. 1978. Of course, other forms of public key cryptography exist, and the descriptions herein are not intended to be limited only to RSA type encryptions.

Current usage of more than two keys allows multiple key holders to sign or encrypt a data packet. However, such current usage typically requires that the use of multiple keys must be performed serially. Thus, only the first key holder that signed or encrypted the data packet can be ensured that he or she is operating on the original data packet. The other key holders are required to trust all previous key holders, since they operate on data encrypted with all the previously applied keys. That is, it is possible for the first key holder to sign and forward data which the remaining key holders may not approve of or wish to sign, but the remaining key holders have no way of knowing the contents of the data they are signing once the first key holder has applied his key. It may be possible for each key holder to sign multiple copies of the data packet, whereby each key holder is the first signer on at least one copy and where all copies, when completely signed must be equivalent. However, this method is cumbersome and duplicates the amount of work necessary, as multiple copies of the original data packet must then be produced.

While existing systems and methods for providing encrypted data have been adequate in the past, improvements are usually welcomed and encouraged. In light of the foregoing, it is desirable to develop systems and methods that permit multiple parties to sign and send an encrypted data packet in a more streamlined and convenient manner.

SUMMARY

It is an advantage of the present invention to provide systems and methods that permit multiple parties to sign and send an encrypted data packet in a more streamlined and convenient manner than what has been required traditionally. This is accomplished at least in part through the use of a parallel encryption of data in the systems and methods provided herein. The disclosed parallel processes allow a key holder to communicate a set of data in a secure fashion and at the same time allows multiple key holders to review and know the contents of the same data that they are signing and encrypting as a group.

According to various embodiments of the present invention, the disclosed cryptographic communication systems may have a first plurality of stations adapted for signing and sending an encrypted communication or data set. Each of the first plurality of stations may include at least one encryption key $K_j$, where j is a number greater than 1. The disclosed cryptographic communication systems may also include a data packet D to be viewed by each of the first plurality of stations, means for encrypting the data packet by each of the first plurality of stations to form an encrypted data packet $E_j$ for transmission to a central processor, and means for combining each of the encrypted data packets, wherein $$E = E_1 * E_2 * \ldots * E_j \bmod M = D^P \bmod M$$

M is a product of two prime factors, and
E is the final encrypted data packet.

Preferably, the means for encrypting can be applied in parallel to allow each of the first plurality of stations to view the contents of the data packet D prior to encrypting the data packet D.

Further embodiments may also include a means for transmitting the final data packet to a second plurality of stations, wherein each of the second plurality of stations includes at least one decryption key $L_m$, where m is a number greater than 1, a means for decrypting the final encrypted data packet E to form a decrypted data packet $D_m$ for transmission to a central processor, and a means for combining each of the decrypted data packets, wherein $$D=D_1{}^*D_2{}^*\ldots{}^*D_i \bmod M = E^s \bmod M$$

where D is the final decrypted data packet.

In various embodiments of the present invention, methods for establishing a parallel cryptographic communication having a plurality of key holders are provided. These disclosed methods can include process steps such as generating a public key P, calculating a secret key S as defined by:

$$P{}^*S \bmod (F_1-1){}^*(F_2-1)=1$$

wherein $F_1$ and $F_2$ are prime factors,
forming a plurality of encryption keys, $K_n$, and a plurality of decryption keys $L_n$ as defined by:

$$(K_1+K_2+\ldots K_n){}^*(L_1+L_2+\ldots L_n)\bmod(F_1-1){}^*(F_2-1)=1$$

wherein $$P=K_1+K_2+\ldots+K_n;$$

$$S=L_1+L_2+\ldots+L_n;$$

and
applying each of the plurality of encryption keys or the plurality of decryption keys in parallel to a data packet, wherein a content of the data packet is viewable by each of the key holders prior to the applying step.

In some embodiments, the method for establishing a parallel cryptographic communication may also comprise hashing a data packet by a first party, signing the hashed data packet with a key I wherein:

$$E_I = H^I \bmod M$$

hashing the data packet by a second party, signing the hashed data packet with a key R wherein:

$$E_R = H^R \bmod M$$

and combining the hashed data packets to generate a final encrypted data packet as:

$$E=E_I{}^*E_R \bmod M$$

wherein the first party and second party are able to view the contents of the data packet before the hashing and signing steps.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods.

DETAILED DESCRIPTION

Figure 1A:
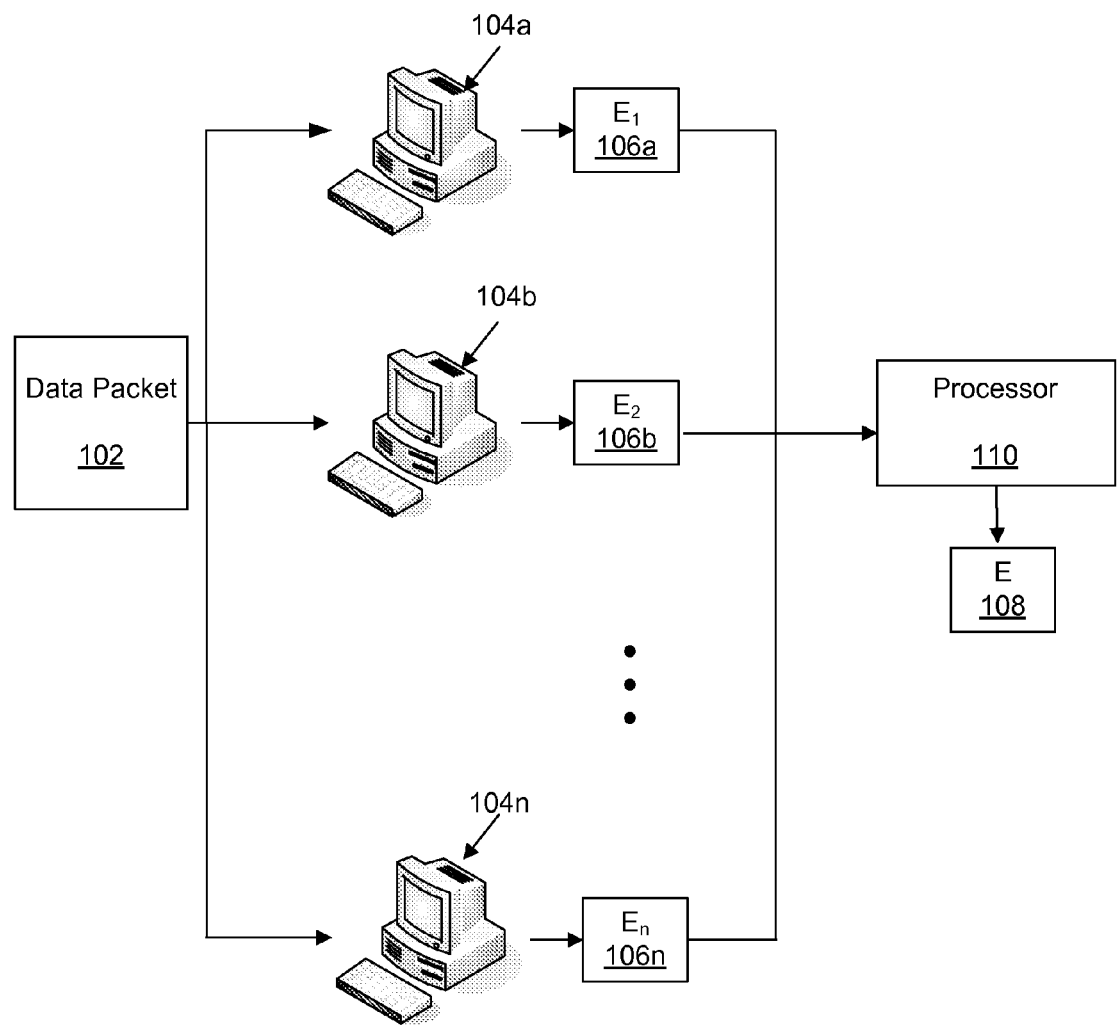
FIGS. 1A and 1B illustrate in block diagram format an exemplary network having a plurality of stations adapted to facilitate the multi-party encryption of data according to one embodiment of the present invention.

Exemplary applications of systems and methods according to the present invention are described as follows. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as definitive or limiting in scope or setting. Although these examples are described in sufficient detail to enable one skilled in the art to practice the invention, it will be understood that they are not limiting, such that other embodiments may be used and changes may be made without departing from the spirit and scope of the invention.

Various embodiments of the present invention are described herein using RSA encryption as an exemplary encryption type. However, it will be understood that the specific encryption type may be different, such that numerous other encryption types and methods can be used. For example, encryption types such as Pohlig-Hellman, ElGamal, LUC, and others may also be used with the systems and methods of the present invention. As such, those of ordinary skill in the art will realize that although the following detailed description might recite RSA encryption terms and features, such use is illustrative only and is not intended to be in any way limiting. Other embodiments will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all routine features of the implementations described herein are shown and described. It will, of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures disclosed herein may be implemented using various types of processors, operating systems, computing platforms, computer programs, and/or general purpose machines. It is specifically contemplated that any such processors, operating systems, computing platforms, computer programs, and/or general purpose machines suitable for use with the process steps and items provided herein may be used as part of and/or in conjunction with the inventive systems and methods.

The present invention provides for parallel encryption, such as, for example, RSA encryption, that allows multiple key holders to sign or encrypt an original data packet. This ensures that each key holder is able to review and know the contents of the data they are signing or encrypting. To achieve this result, RSA encryption may be adapted for the use of more than two keys, wherein the multiple keys are applied in parallel. As is common in RSA encryption:

$$P*S \bmod (F_1-1)*(F_2-1)=1 \tag{1}$$

$$M=F_1*F_2 \tag{2}$$

where:
P is the public key,
S is the secret key,
$F_1$ and $F_2$ are prime factors, and
M is the modulus.

Prime factors $F_1$ and $F_2$ are preferably greater than 124 bits, although it will be readily appreciated that smaller numbers may also be used. For the calculations below, keys $K_1$-$K_n$ may represent encryption keys, while keys $L_1$-$L_n$ may represent decryption keys. $K_1, K_2, \ldots K_n$ and $L_1, L_2, \ldots L_n$ may be selected such that:

$$(K_1+K_2+\ldots+K_n) \bmod (F_1-1)*(F_2-1)=P \bmod (F_1-1)*(F_2-1) \text{ and} \tag{3}$$

$$(L_1+L_2+\ldots+L_n) \bmod (F_1-1)*(F_2-1)=S \bmod (F_1-1)*(F_2-1) \tag{4}$$

where: n is a positive integer.
The combination of (3) and (4) results in:

$$(K_1+K_2+\ldots+K_n)*(L_1+L_2+\ldots+L_n) \bmod (F_1-1)*(F_2-1)=1 \tag{5}$$

Due to the modulo operation, one or more $K_n$ values may be greater than or equal to P, and one or more $L_n$ values may be greater than or equal to S. Additionally, the equations may be solved without a predetermined P or S value. Namely, all keys but one may be randomly chosen and the equation solved for the last key. As noted above, other forms of encryption besides RSA encryption may also be used, such that reference to RSA encryption shall not be limiting.

Figure 1B:
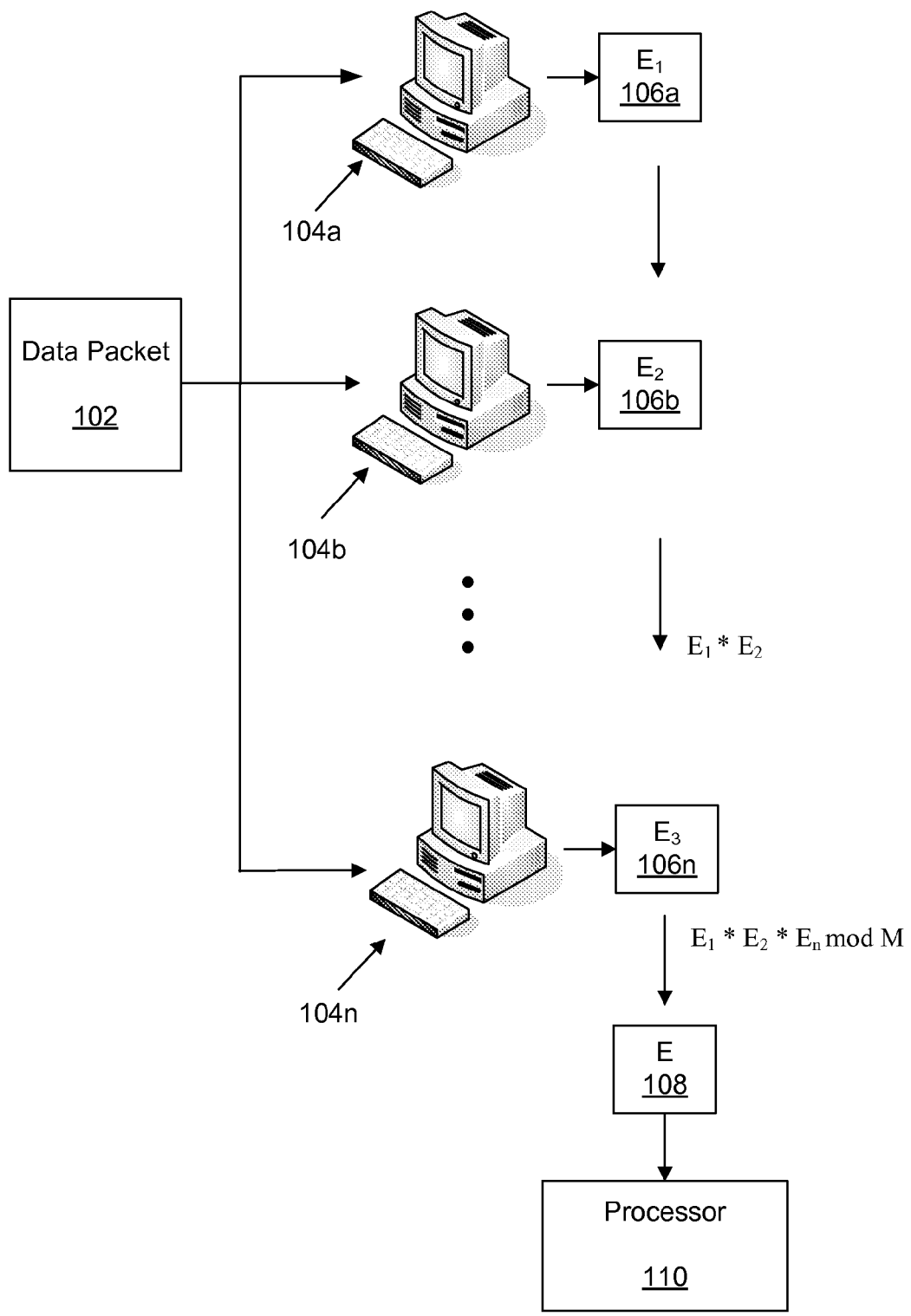

Turning first to FIGS. 1A and 1B, an exemplary network having a plurality of stations adapted to facilitate the multiparty encryption of data according to one embodiment of the present invention is illustrated in block diagram format. As shown, a data packet 102 may be sent to each key holder 104a, 104b, through 104n for review and signature. As will be readily appreciated, key holders 104a through 104n may represent any number of two or more key holders, with the format used herein being presented for convenience and illustrative purposes only. Once reviewed, each key holder 104i may encrypt the data packet 102 by applying the following equation to the data packet 102:

$$E_i=D^{K_i} \bmod M \tag{6}$$

where:
i is a positive integer less than or equal to n
E is the encrypted data packet
D are data chunks of the data packet with numerical values less than M
K is the encryption key for the key holder.

This allows each key holder 104a, 104b, through 104n to review and inspect the original data packet 102 before encryption. Each key holder 104a, 104b, through 104n can perform the encryption operation in parallel with all other encryption key holders, such that the timing and order of performance by each key holder can vary.

Once the data packets are encrypted by each key holder, the resulting encrypted data packets 106a, 106b, through 106n may be transmitted to a processor 110 to combine the encrypted data packets 106a, 106b, through 106n with the following equation:

$$E=E_1*E_2*\ldots*E_n \bmod M \tag{7}$$

where: E is the final encrypted data packet 108 and
where the equation is equivalent to:

$$E=D^{K_1}*D^{K_2}*\ldots*D^{K_n} \bmod M \tag{8}$$

$$E=D^{(K_1+K_2+\ldots K_n)} \bmod M \tag{9}$$

$$E=D^P \bmod M \tag{10}$$

The encrypted data packet E may be transmitted to the intended recipient(s) for decryption. To decrypt the data packet, each decryption key holder may apply the following equation:

$$D_i=E^{L_i} \bmod M \tag{11}$$

Each decryption key holder may perform the operation above on the original data packet with his decryption key to partially decrypt the data packet.

The resulting partially decrypted data packets may then be combined by the following equation:

$$D=D_1*D_2*\ldots*D_n \bmod M \tag{12}$$

where: D is the final decrypted data packet and
where the equation is equivalent to:

$$D=E^{L_1}*E^{L_2}*\ldots*E^{L_n} \bmod M \tag{13}$$

$$D=E^{(L_1+L_2+\ldots L_n)} \bmod M \tag{14}$$

$$D=E^S \bmod M \tag{15}$$

As illustrated in FIG. 1A, the combination of the encrypted and/or decrypted data packets may be performed cumulatively, such as by a central processor 110 as each key holder 104a, 104b, through 104n submits the resulting $E_i$ 106a, 106b, through 106n or $D_i$. Alternatively, as illustrated in FIG. 1B, the combination may be performed by each of the key holders 104a, 104b, through 104n as he or she combines his results with the accumulated results of the previous key holders. The final resulting encrypted (or decrypted) data packet, E 108, may then be transmitted to the central processor 110. Additionally, the combination may be performed at one time, such as by a central processor or designated key holder.

In another embodiment, negative numbers may be chosen to perform the encryption and decryption operation. The keys may be selected such that:

$$(K_1-K_2)*S \bmod (F_1-1)*(F_2-1)=1 \tag{16}$$

To encrypt the data packet, the two parties holding keys $K_1$ and $K_2$ may each independently produce the following:

$$E_1=D^{K_1} \bmod M \tag{17}$$

$$E_2=D^{K_2} \bmod M \tag{18}$$

which may be combined by:

$$E=(E_1/E_2) \bmod M \tag{19}$$

and is equivalent to:

$$E = D^{K_1}/D^{K_2} \bmod M \qquad (20)$$

$$E = D^{(K_1 - K_2)} \bmod M \qquad (21)$$

If the encryption key selected is positive, the user may encrypt the data with the following equation:

$$E_i = D^{K_i} \bmod M \qquad (22).$$

Calculation of the combination of the results may be conducted as described above with reference to equations (7)-(10).

If the encryption key selected is negative, the user may encrypt the data with the following equation:

$$E_i = (1/D)^{K_i} \bmod M \text{ or} \qquad (23)$$

$$E_i = 1/(D^{K_i}) \bmod M \qquad (24).$$

Calculation of the combination of the results may then be conducted as described above with reference to equations (7)-(10).

To decrypt the data packet, the two parties holding keys $L_1$ and $L_2$ may each independently produce the following decrypted data packets $D_1$ and $D_2$:

$$D_1 = E^{L_1} \bmod M \qquad (25)$$

$$D_2 = E^{L_2} \bmod M \qquad (26)$$

which may be combined by:

$$D = (D_1/D_2) \bmod M \qquad (27)$$

and is equivalent to:

$$D = E^{L_1}/E^{L_2} \bmod M \qquad (28)$$

$$D = E^{(L_1 - L_2)} \bmod M \qquad (29).$$

If the decryption key selected is positive, the user may decrypt the data with the following equation:

$$D_i = E^{L_i} \bmod M \qquad (30).$$

Calculation of the combination of the results may be conducted as described above with reference to equations (12)-(15).

If the decryption key selected is negative, the user may decrypt the data with the following equation:

$$D_i = (1/E)^{L_i} \bmod M \text{ or} \qquad (31)$$

$$D_i = 1/(E^{L_i}) \bmod M \qquad (32).$$

Calculation of the combination of the results may then be conducted as described above with reference to equations (12)-(15).

In yet another embodiment, the key may be split into a plurality of sub-components. For exemplary purposes only, which are not intended to be limiting in any way, encryption key P=0x1FE4CB7A may be split into 0x10E0C070 and 0x0F040B0A, or into 0X1FE40000 and 0x0000CB7A, for example. Although the number of keys increases, the number of mathematical operations to encrypt or decrypt the data is not significantly increased. Raising a number to a power for encryption requires one squaring operation for each bit in the key size and one multiplication operation for each bit set. Since the bit sets are split between the two keys, no extra multiplication operations are required.

Additionally, a "combination" key may be used to determine how the keys may be combined. For exemplary purposes only, which are not intended to be limiting in any way, the encryption key P=0x1FE4CB7A may be split into two keys, $K_1$=0x1FE4 and $K_2$=0xCB7A, for example. To encrypt the data packet, each encryption key holder may apply the following equation:

$$E_1 = D^{K_1} \bmod M = D^{0x1FE4} \bmod M \qquad (33)$$

$$E_2 = D^{K_1} \bmod M = D^{0xCB7A} \bmod M \qquad (34)$$

and the combination of the keys results in the formula:

$$E = E_1^{0x10000} * E_2 \bmod M \qquad (35)$$

which is equivalent to:

$$E = (D^{K_1})^{0x10000} * D^{K_2} \bmod M \qquad (36)$$

$$E = (D^{0x1FE4})^{0x10000} * D^{0xCB7A} \bmod M \qquad (37)$$

$$E = D^{0x1FE4 * 0x10000} * D^{0xCB7A} \bmod M \qquad (38)$$

$$E = D^{0x1FE4 * 0x010000 + 0xCB7A} \bmod M \qquad (39)$$

$$E = D^{0x1FE40000 + 0xCB7A} \bmod M \qquad (40)$$

$$E = D^{0x1FE4CB7A} \bmod M \qquad (41)$$

$$E = D^P \bmod M \qquad (42).$$

The number of mathematical operations required for multiple key encryptions is reduced by reducing the number of squaring operations.

In a further embodiment, the same keys used to encrypt the data may also be used to decrypt the data such that the encryption and decryption keys are symmetrical. Thus:

$$K \bmod (F_1-1)*(F_2-1) = (F_1-1)*(F_2-1)-1 \text{ or} \qquad (43)$$

$$K \bmod (F_1-1)*(F_2-1) = -1 \bmod (F_1-1)*(F_2-1) \qquad (44)$$

which is equivalent to:

$$K^2 \bmod (F_1-1)*(F_2-1) = 1 \qquad (45).$$

Each key may be applied to both the encryption and decryption of the data packet. However, the same parties that encrypt the data are also required to decrypt the data. Additionally, this embodiment may also be used with any of the above embodiments, such as splitting the key into multiple keys which results in the following operation:

$$(K_1*K_2*\ldots*K_n) = K \bmod (F_1-1)*(F_2-1) \text{ for keys applied in series} \qquad (46)$$

$$(K_1+K_2+\ldots+K_n) = K \bmod (F_1-1)*(F_2-1) \text{ for keys applied in parallel} \qquad (47).$$

This process allows each party the ability to inspect the contents of the data that it is signing or encrypting to verify that the contents are original. Furthermore, more than one employee or hardware device may be used, each holding a unique key, to decrypt or authenticate the data to ensure that the data is not accessible when unauthorized.

Although the above examples are described with an encryption and decryption operation, it will be understood that the above embodiments may be used for authentication and signing of the data packet. Moreover, although only illustrated with two prime factors ($F_1$ and $F_2$), it will be understood that more than two prime numbers may be used where:

$$M = F_1 * F_2 * \ldots * F_n \text{ and} \qquad (48)$$

$$P*S \bmod (F_1-1)*(F_2-1)* \ldots *(F_n-1) = 1 \qquad (49).$$

It will be understood that the foregoing parallel encryption scheme embodiments may be employed using any suitable computer architecture. For exemplary purposes only, and not intended to be limiting, the following examples of the invention will be described as utilized in a gaming environment. However, the invention may be used in another other fields, such as with financial transactions, Internet communications, and other transactions involving encrypted items that are to be reviewed, signed and sent by multiple parties.

Exemplary Gaming Application

Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. Additionally, it is unacceptable to game content providers and gaming regulators to allow the use of unauthorized and untracked software on gaming platforms. To be properly compensated, game content providers want to know where and how much their software is being used. To ensure fairness, gaming regulators need to be able show that game software residing on a gaming machine is authentic and approved game software from an authorized content provider. Further, a given manufacturing source and regulatory body(s) can review, encrypt and sign a given data set, while a gaming operator can then verify via a single step that that given data set came from the proper source and was approved by the requisite regulatory body(s).

Figure 2:
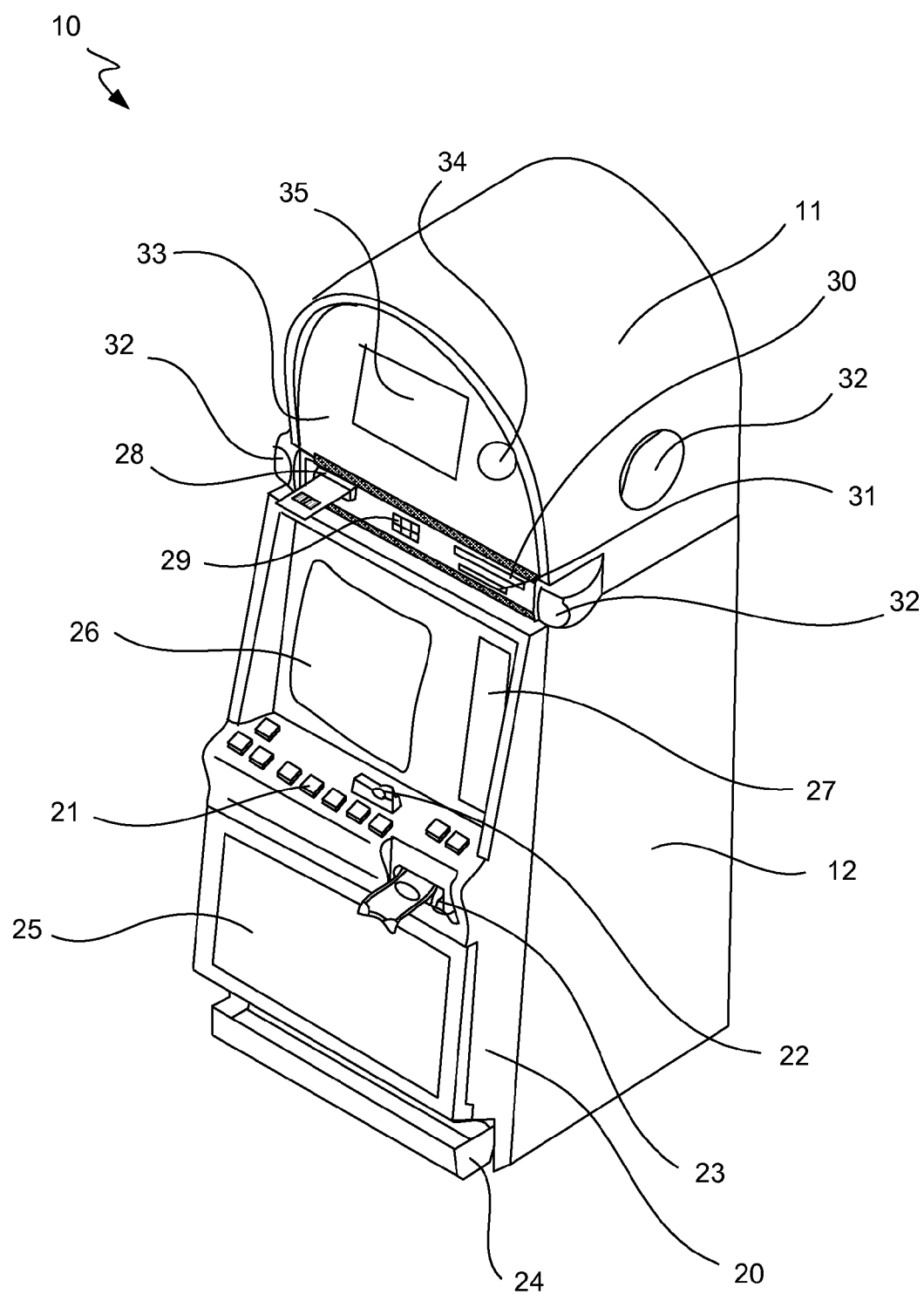
FIG. 2 illustrates in perspective view an exemplary gaming machine.

Referring next to FIG. 2, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above. Such gaming machines are made by a variety of manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/ software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage-monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions.

One item that is specifically contemplated for use with the present invention involves a gaming machine adapted to operate with respect to a multi-party encryption system. For example, gaming machine 10 can be adapted to download new content only when such content has been approved through a decryption of data that was encrypted using a multi-party encryption process. In some embodiments, the processor based gaming machine itself may be used in the encryption or decryption process. In fact, many existing processor based gaming machines are already adapted to use RSA encryption as part of an authentication process. Such items can be found, for example, in U.S. Pat. Nos. 5,643,086 and 7,063,615, among other references. Such gaming machines could be readily adjusted to use a single decryption key to authenticate a downloaded data set that was encrypted in parallel by multiple discrete parties, as disclosed herein. Further, those of skill in the art will understand that the present invention can be conducted with respect to and/or deployed on most any processor based gaming machine now available or hereafter developed.

Methods of Implementation

Figure 3:
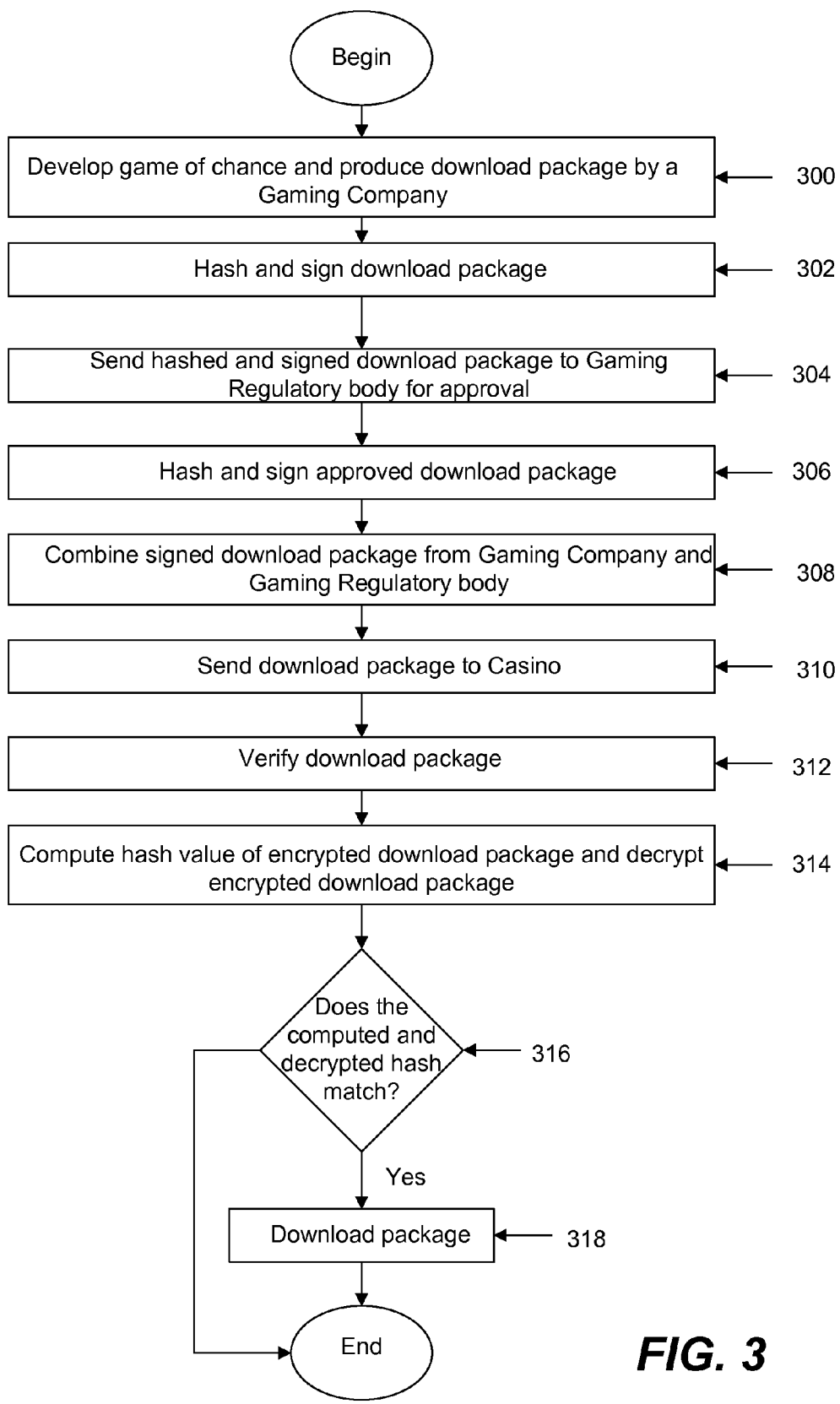
FIG. 3 illustrates a flowchart of one method of applying a multi-party data encryption process in parallel in a gaming environment according to one embodiment of the present invention.

FIG. 3 illustrates a flowchart of one method of applying a multi-party data encryption process in parallel in a gaming environment according to one embodiment of the present invention. With respect to FIG. 3, encryption keys I, R, and C may be chosen such that:

$$(I+R)*C \mod (F_1-1)*(F_2-1)=1 \text{ and} \quad (50)$$

$$M=F_1*F_2 \quad (51).$$

A gaming company, such as IGT, for example, may be designated to distribute the encryption and decryption keys. Thus, IGT may retain key I, while a Gaming Regulatory body ("GR") may obtain key R, and a Casino or other gaming operator may be given key C. The gaming company (e.g., IGT) may develop a new or updated game of chance and produce a download package for the game of chance at process step 300. A gaming company representative may then hash the download package and sign the hash, H, at process step 302 with:

$$E_I = H^I \mod M \quad (52).$$

The download package and the hashed and signed download package may then be sent to GR for approval at process step 304. GR may review the download package and if approved, would hash the download package and sign the hash at process step 306 with:

$$E_R = H^R \mod M \quad (53).$$

Either the gaming company or GR may then produce the final encrypted hash at 308 with:

$$E = E_I * E_R \mod M \quad (54).$$

Encrypted hash E, Casino key C, and modulus M may be added to the download package. Alternatively, key C and modulus M may be transmitted to the Casino in a separate communication rather than included in the game download.

The downloaded package may then be sent to the Casino at process step 310 and received by the master gaming controller or a remote server for processing. Once the downloaded package is verified by the Casino at process step 312, the Casino computes the hash as well as decrypts the encrypted hash at process step 314 with:

$$H = E^C \mod M \quad (55).$$

The decrypted hash may be compared to the computed hash at decision step 316. If the hashes match, then the Casino will know that the downloaded package came from the appropriate source (e.g., IGT) and was approved by GR. The download package may then be downloaded at process step 318. Parallel encryption may also allow for more than one regulatory body to approve the downloaded package, with each such body having its own keys. In another embodiment, the Casino may be required to use a plurality of keys in any parallel or serial combination for additional security.

This allows the Casino to verify that a download package came from the designated source (i.e., IGT or other appropriate gaming company) and that it was approved by a gaming regulatory body in one single decryption/encryption step.

Additionally, each party was able to inspect the contents of the data that it is signing or encrypting to verify that the contents are the original contents. Furthermore, more than one casino employee or hardware device may be used, with each holding a unique key, to decrypt or authenticate the download program to ensure that the download is not accessible when unauthorized.

Although the embodiments described above reference IGT, GR, and a Casino, it will be readily appreciated that many other parties and party types may apply. For example, there are many other gaming manufacturers and providers besides IGT, other governmental or standards type bodies besides a regulatory body, and other gaming operators besides casinos. Further, such implementations may be provided with respect to financial transactions or simple multi-party communications. For example, "IGT" may represent any corporation, "GR" may represent a securities commission, and "C" may represent shareholders. Alternatively, a group letter written by I and G may be reviewed, encrypted and signed by both I and G separately before being sent securely to recipient C.

Figure 4:
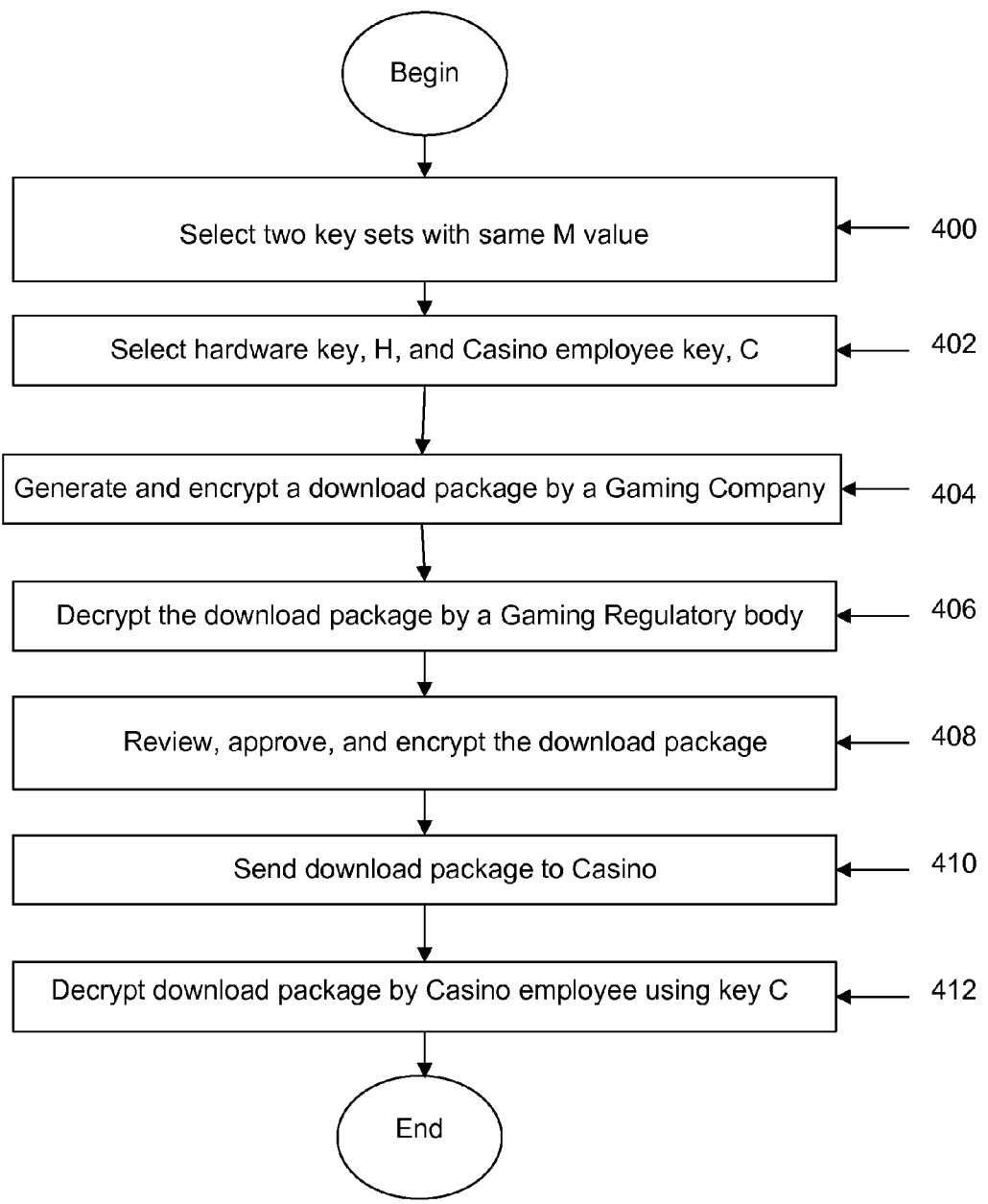
FIG. 4 illustrates a flowchart of one method of applying a multi-party data encryption process serially in a gaming environment according to one embodiment of the present invention.

Although the embodiments described above are performed in parallel, the invention may also be applied to serial applications. FIG. 4 illustrates a flowchart of one method of applying a multi-party data encryption process serially in a gaming environment according to one embodiment of the present invention. Two key sets for the same modulus M value may be generated at process step 400 by:

$$M = F_1 * F_2 \text{ and} \tag{56}$$

$$I * R^2 \bmod (F_1-1) * (F_2-1) = 1 \tag{57}$$

IGT (or any other appropriate source) may select a hardware key, H, and a Casino employee key, C, at process step 402 such that:

$$C * H \bmod (F_1-1) * (F_2-1) = R \text{ and} \tag{58}$$

$$I * R^2 \bmod (F_1-1) * (F_2-1) = I * R * C * H \bmod (F_1-1) * (F_2-1) = 1 \tag{59}$$

IGT may then generate a download package and encrypts the download package at process step 404 with:

$$E_f = D^I \bmod M \tag{60}$$

and send it to GR. GR may decrypt the data at process step 406 with:

$$D = E_f^{R*R} \bmod M \tag{61}$$

Once GR approves the download package, GR may further encrypt the download package at process step 408 with:

$$E = E_f^R \bmod M \tag{62}$$

E may then be made available for download by Casino at process step 410, which decrypts the data at process step 412 with:

$$D = E^{C*H} \bmod M \tag{63}$$

As stated above this allows the Casino to verify that a download came from the proper source and that it was approved by a gaming regulatory body all in one single decryption/encryption step. Additionally, each party is able to inspect the contents of the data that it is signing and/or encrypting to verify that the contents are the original contents. Furthermore, more than one casino employee or hardware device may be used, each holding a unique key, to decrypt or authenticate the download program to ensure that the download is not accessible when unauthorized.

In some embodiments, a gaming company may negotiate a set of keys for use with a regulator and then elect to subdivide its key so as to allow a contractor to develop a data set to be distributed by the gaming company. In this case, the contractor can use its key to sign the data set that it produces. The gaming company can then review the original data set for acceptability and then sign it using the complementary key. The gaming company can then combine both signatures to show that the data set was produced by the contractor and approved by the gaming company. The data set can then be distributed to the regulator for final approval and signature. When the final signature is authenticated, the gaming operator then knows that the gaming content was distributed by the gaming company and approved by the regulator. The gaming company knows that if the content was not properly signed by the contractor, then it will not be authenticable. This example illustrates the concept of multiple steps of key combination. That is, all encryption keys do not necessarily need to be combined in one fell swoop at the end of the encryption step. Rather, keys can be combined at various times and/or stages, as may be desired.

In still further embodiments, Keys $K_1, K_2, \ldots K_n$ may represent a signature by the producers and approvers of a data set, keys $L_1, L_2, \ldots L_n$ may represent authentication of the data set by the end user and keys, $J_1, J_2, \ldots J_n$ may represent permission to authenticate and use the data set by a vendor. The keys can then be chosen such that $(J_1+J_2+\ldots+J_n)*(K_1+K_2+\ldots+K_n)*(L_1+L_2+\ldots+L_n) \bmod (F_1-1)*(F_2-1)=1$. Thus, the data set can be signed by one or more parties, but must be allowed by one or more parties (through the application of their keys) before the end user can ultimately authenticate or decrypt the data set. If the vendor and manufacturer are the same, then keys $J_1+J_2+\ldots+J_n$ may be equivalent to keys $K_1+K_2+\ldots+K_n$, such that $(K_1+K_2+\ldots+K_n)^2*(L_1+L_2+\ldots+L_n) \bmod (F_1-1)*(F_2-1)=1$ Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A cryptographic communication system, comprising:
   i encryption keys $K_1, \ldots K_i$, wherein i is an integer greater than 1;
   a first plurality of stations, each station in the first plurality of stations associated with at least one of the encryption keys $K_1, \ldots, K_i$;
   an initial data packet $D_0$, the initial data packet $D_0$ available for review at each of the stations in the first plurality of stations;
   means for encrypting the initial data packet $D_0$ to form i encrypted data packets $E_1, \ldots, E_i$, each encrypted data packet $E_m$ of encrypted data packets $E_1, \ldots, E_i$ encrypted according to the encryption key $K_m$ of encryption keys $K_1, \ldots, K_i$ by the station associated with the encryption key $K_m$, where m ranges from 1 to i; and
   means for combining each of the encrypted data packets $E_m$ into a final encrypted data packet $E_f$, wherein $$E_f = (E_1 * E_2 * \ldots * E_i) \bmod M = D_0^P \bmod M$$

wherein M is the product of multiplying a first prime factor $F_1$ and a second prime factor $F_2$, wherein the means for encrypting is applied in parallel to allow each station in the first plurality of stations to view the contents of the data packet $D_0$ prior to encryption of the data packet $D_0$, and wherein the encryption keys $K_1, \ldots K_i$ are used to form a public key P.

2. The cryptographic communication system of claim 1, further comprising;

j decryption keys $L_1, \ldots, L_j$, wherein is an integer greater than 1;

means for transmitting the final encrypted data packet $E_f$ to a second plurality of stations, each station in the second plurality of stations associated with at least one of the decryption keys $L_1, \ldots L_j$;

means for decrypting the final encrypted data packet $E_f$ to form j decrypted data packets $D_1, \ldots, D_j$ for transmission to a central processor; and means for combining each of the decrypted data packets $D_1$ through $D_j$ into a final decrypted data packet $D_f$, wherein $$D_f = (D_1 * D_2 * \ldots * D_j) \bmod M = E^S \bmod M.$$

3. The cryptographic communication system of claim 2, wherein the sum of encryption keys $K_1$ through $K_i$ is equal to a public key P and wherein the sum of decryption keys $L_1$ through $L_j$ is equal to a secret key S.

4. The cryptographic communication system of claim 3, wherein the public key P may be split into a plurality of subcomponents.

5. The cryptographic communication system of claim 3, wherein the secret key S may be divided into a plurality of subcomponents.

6. The cryptographic communication system of claim 2, wherein each encryption key $K_m$ of the encryption keys $K_1, \ldots, K_i$ is equal to corresponding decryption key $L_n$ of the decryption keys $L_1, \ldots, L_j$, where n ranges from 1 to j wherein such that:

$$K_m^2 \bmod (F_1-1)*(F_2-1) = 1 \text{ and}$$

i=j.

7. A method for establishing on at least one computing device a parallel cryptographic communication having a plurality of key holders, comprising:

generating a public key P;

calculating, using the at least one computing device, a secret key S such that:

$$P*S \bmod (F_1-1)*(F_2-1) = 1,$$

wherein $F_1$ and $F_2$ are prime factors;

forming, using the at least one computing device, a plurality of i encryption keys $K_1$ through $K_i$ and a plurality of i decryption keys $L_1$ through $L_i$, where i is an integer greater than 1, such that:

$$[(K_1+K_2+\ldots+K_i)*(L_1+L_2+\ldots+L_i)] \bmod [(F_1-1)*(F_2-1)]=1$$

wherein $P = K_1+K_2+\ldots+K_i$;

$S = L_1+L_2+\ldots L_i$; and applying each of the plurality of encryption keys in parallel to an initial data packet $D_0$, wherein unencrypted content of the initial data packet $D_0$ is viewable by each of the key holders prior to the applying step, or applying each of the plurality of decryption keys in parallel to the initial data packet $D_0$, wherein the unencrypted content of the initial data packet $D_0$ is viewable by each of the key holders after the applying step.

8. The method of claim 7, further comprising the steps of:

encrypting the initial data packet $D_0$ to form $E_1$ through $E_i$ encrypted data packets, with each encrypted data packet $E_m$ of the $E_1$ through $E_i$ encrypted data packets formed using encryption key $K_m$ of the plurality of encryption keys $K_1$ through $K_i$, where m ranges from 1 to i, the encrypting performed according to:

$$E_m = D_0^{K_m} \bmod M \text{ and } M = F_1 * F_2$$

if $K_m$ is a positive number, and according to:

$$E_m = 1/D_0^{K_m} \bmod M \text{ and } M = F_1 * F_2$$

if $K_m$ is a negative number.

9. The method of claim 8, further comprising the step of:

transmitting each encrypted data packet $E_m$ of the encrypted data packets $E_1, \ldots E_i$ to a central processor.

10. The method of claim 8, further comprising the step of:

combining the encrypted data packets $E_1, \ldots, E_i$ to obtain a final encrypted data packet $E_f$ defined by:

$$E_f = E_1 * E_2 * \ldots * E_i \bmod M = D_0^P \bmod M.$$

11. The method of claim 10, further comprising the steps of:

decrypting the final encrypted data packet $E_f$ to form $D_1, \ldots, D_i$ decrypted data packets, with each decrypted data packet $D_m$ of the $D_1, \ldots, D_i$ decrypted data packets formed using decryption key $L_m$ of the plurality of decryption keys $L_1, \ldots, L_i$, the decrypting performed according to:

$$D_m = E_f^{L_m} \bmod M \text{ and } M = F_1 * F_2$$

if $L_m$ is a positive number, and according to:

$$D_m = 1/E_f^{L_m} \bmod M \text{ and } M = F_1 * F_2$$

if $L_m$ is a negative number.

12. The method of claim 11, further comprising the step of:

transmitting each decrypted data packet $D_m$ of the decrypted data packets $D_1, \ldots, D_i$ to a central processor.

13. The method of claim 11, further comprising the step of:

combining the decrypted data packets $D_1, \ldots, D_i$ to obtain a final decrypted data packet $D_f$ defined by:

$$D_f = D_1 * D_2 * \ldots * D_i \bmod M = E_f^S \bmod M.$$

14. The method of claim 13, further comprising the step of:

transmitting the final decrypted data packet $D_f$ to a central processor.

15. The method of claim 7, further comprising the step of:

splitting the public key P into a plurality of subcomponents.

16. The method of claim 7, further comprising the step of:

splitting the secret key S into a plurality of subcomponents.

17. The method of claim 7, wherein each $K_m$ of the plurality of encryption keys $K_1, \ldots, K_i$ is equal to each $L_m$ of the plurality of decryption keys $L_1, \ldots, L_i$ such that:

$$K_m^2 \bmod (F_1-1)*(F_2-1) = 1.$$

18. A method for establishing a parallel cryptographic communication on a computing device, comprising:

hashing a data packet into a hashed data packet H;

encrypting the hashed data packet H with a key I into an encrypted packet $E_1$ by a first party, wherein:

$$E_1 = H^I \bmod M,$$

wherein M is the product of two prime numbers;

encrypting the hashed data packet H with a key R into an encrypted packet $E_R$ by a second party, wherein:

$E_R = H^R \bmod M$; and combining the encrypted data packets to generate a final encrypted data packet $E_f$ according to:

$E_f = E_I * E_R \bmod M$ wherein the first party and the second party are able to view the contents of the data packet before the hashing and encrypting steps.

19. The method of claim 18, further comprising the steps of:

decrypting the final encrypted data packet by a third party having a decryption key C wherein:

$H = E_f^C \bmod M$ computing the hashed value of the encrypted data packet $E_f$; and matching the decrypted data packet with the computed hashed data packet to authenticate the data packet.

* * * * *

UNITED STATES PATENT AND TRADEMARK OFFICE
CERTIFICATE OF CORRECTION

PATENT NO.         : 7,917,747 B2
APPLICATION NO.    : 11/690054
DATED              : March 29, 2011
INVENTOR(S)        : Bryan Wolf It is certified that error appears in the above-identified patent and that said Letters Patent is hereby corrected as shown below:

CLAIMS:

Column 17, line 9 change "wherein is an integer" to --wherein j is an integer--.

Column 17, line 35 change "from 1 to j wherein" to --from 1 to j--.

Column 18, line 12 change " $E_m = 1/D_o^K m \mod M$ " to -- $E_m = (1/D_o^K m) \mod M$ --.

Column 18, line 37 change " $D_m = 1/E_f^J m \mod M$ " to -- $D_m = (1/E_f^J m) \mod M$ --.

Column 18, line 65 change "$E_i$" to --$E_I$--.

Signed and Sealed this
Fourteenth Day of February, 2012

David J. Kappos
*Director of the United States Patent and Trademark Office*